United States Patent [19]

Wang et al.

[11] Patent Number: 5,364,186
[45] Date of Patent: Nov. 15, 1994

[54] APPARATUS AND METHOD FOR MONITORING A TEMPERATURE USING A THERMALLY FUSED COMPOSITE CERAMIC BLACKBODY TEMPERATURE PROBE

[75] Inventors: Zhihai Wang, Beaverton; Bruce Adams, Portland, both of Oreg.

[73] Assignee: Luxtron Corporation, Santa Clara, Calif.

[21] Appl. No.: 874,829

[22] Filed: Apr. 28, 1992

[51] Int. Cl.$^5$ .......................... G01J 5/08; G01K 11/00
[52] U.S. Cl. ..................................... 374/126; 374/131
[58] Field of Search ................... 374/126, 131; 356/44; 250/338.1, 340

[56] References Cited

U.S. PATENT DOCUMENTS

| | | |
|---|---|---|
| 3,529,121 | 9/1990 | Bobo . |
| 3,626,758 | 12/1971 | Stewart et al. ........................ 374/131 |
| 4,313,344 | 2/1982 | Brogardh et al. ..................... 374/131 |
| 4,469,721 | 9/1984 | Shioya .............................. 427/397.8 |
| 4,576,486 | 3/1986 | Dils ..................................... 374/131 |
| 4,600,659 | 7/1986 | Hong et al. ............................ 427/453 |
| 4,679,934 | 7/1987 | Ganguly et al. ........................ 356/43 |
| 4,737,038 | 4/1988 | Dostoomian .......................... 374/131 |
| 4,750,139 | 6/1988 | Dils ..................................... 374/133 |
| 4,770,544 | 9/1988 | Mossey .................................. 374/131 |
| 4,794,619 | 12/1988 | Tregay ................................. 374/131 |
| 4,859,079 | 8/1989 | Wickersheim et al. ............... 374/131 |
| 4,870,672 | 9/1989 | Lindberg .............................. 427/126.3 |
| 4,906,106 | 3/1990 | Kaufman .............................. 374/131 |
| 4,953,190 | 8/1990 | Kukoleck et al. .................... 427/421 |
| 4,986,671 | 1/1991 | Sun et al. ............................. 374/131 |
| 5,032,731 | 7/1991 | Dall'Oglio ............................. 374/32 |
| 5,078,507 | 1/1992 | Koller .................................. 374/131 |
| 5,112,137 | 5/1992 | Wickersheim et al. ............... 374/131 |
| 5,164,999 | 11/1992 | Shifflett .............................. 374/131 |

FOREIGN PATENT DOCUMENTS 2046210U 10/1989 China .
0425229A1 2/1991 European Pat. Off. .
2045921 11/1980 United Kingdom ............... 374/131

OTHER PUBLICATIONS

Hypszer et al., "Optical Fibre Temperature Sensor Based on a black body Radiation", *SPIE*, vol. 1085, Optical Fibres and Their Applications V, pp. 476–479, (1989).

Zhihai Wang, "Blackbody Optical Fiber Termometers and their Applications," Ph.D. Thesis, Qing-Hua University Beijing, Peoples Republic of China Sep., 1989.

Holmes, "Fiber Optic Probe for Thermal Profiling of Liquids During Crystal Growth", *Rev. Sci. Instrum.*, 50(5). pp. 662–663 (May, 1979).

Rokide Ceramic Coating System Brochure, Norton Company, Worchester, Mass. (no date).

*Primary Examiner*—William A. Cuchlinski, Jr.
*Assistant Examiner*—Diego F. F. Gutierrez
*Attorney, Agent, or Firm*—Majestic, Parsons, Siebert & Hsue

[57] ABSTRACT

A blackbody high temperature probe is formed by thermally fusing a coating of composite ceramic material on the tip of a high temperature lightpipe or fiber. The ceramic coating replaces conventional sputtered metallic thin films to form a blackbody optical cavity. The ingredients of the composite ceramic material include a mixture of refractory metal oxides forming the bulk of the material, various pigments and/or refractory metal powders, and binding agents. A firing process is used to thermally fuse the coating onto the lightpipe. Embodiments of the firing process include using a flame or furnace technique, or alternatively using various flame- or plasma- spraying techniques. A thermally fused coating of from 10 to a few hundred micrometers provides a durable blackbody temperature sensor suitable for use in a wide range of applications including measurements in high temperature, high flow rate and abrasive environments such as that encountered in an internal combustion engine, gas turbine or rocket exhaust stream.

5 Claims, 2 Drawing Sheets

APPARATUS AND METHOD FOR MONITORING A TEMPERATURE USING A THERMALLY FUSED COMPOSITE CERAMIC BLACKBODY TEMPERATURE PROBE

FIELD OF INVENTION

This invention relates generally to a temperature measuring apparatus and methods for fabricating and using it, and more particularly, to ones employing a blackbody optical cavity which is formed by a thermally fused coating of composite ceramic material on the tip of an optical lightpipe or fiber.

BACKGROUND OF THE INVENTION

For high temperature above 500° C., three types of temperature measuring devices are commonly used. They are thermocouples, optical pyrometers and blackbody temperature sensors.

Thermocouple devices are generally inexpensive, but are not suitable for protracted use in harsh environments in which rapid temperature fluctuations are to be measured. If thermocouples are made very small to reduce their thermal mass and thereby to improve their high frequency response, they then become too fragile for many applications. Furthermore, they cannot withstand prolonged exposure to very high temperature without degradation and the need for periodic replacement. First, the thermocouple junction may change composition or become contaminated, upon prolonged exposure to high temperature resulting in inaccuracies due to a change in calibration. Second, a form of hysteresis may be caused upon repeated temperature cycling by temperature induced changes in grain size of the materials forming the junction.

Radiation pyrometers are more suitable for measuring very high temperatures in that the sensor need not be located in the high temperature environment. However, specific knowledge of emissivity, which is difficult to obtain in practice, must be available for an accurate conversion of the intensity of the measured radiation into temperature. Furthermore, the environment to be measured must be visible by an non-absorbing light path from the detector location, so that the radiation emitted can be measured correctly. Reflections and radiation from region other than of interest can also pose serious complications if these contribute significantly to the radiation received by the detector.

Blackbody or greybody temperature sensors are increasingly becoming preferred as high temperature measuring devices because they do not suffer from the disadvantages discussed above. A blackbody temperature sensor is based on the principle of detecting the radiation emitted from a blackbody emitter placed in a high temperature environment the temperature of which is to be measured. A theoretical blackbody has the property of zero reflectivity, and a emissivity of unity. In practice, when the emissivity is less than unity but is substantially independent of wavelength, the blackbody emitter is sometime referred to as a "greybody" emitter. When the blackbody emitter is at thermal equilibrium with the environment, the radiation emitted by the blackbody is a known function of the temperature of the environment, as given by well-defined physical laws. Furthermore, the calibration of the blackbody sensor can be determined in advance of the measurement. Thus, by detecting the radiation from the blackbody emitter, the temperature of the environment can be accurately determined. The radiation is usually guided to an external detector and instrumentation for sensing and displaying the temperature. Typically, the blackbody emitter is disposed at the tip of an optical lightpipe fabricated from a suitably transparent material able to withstand the temperature of interest. The radiation is guided through the optical lightpipe to a cooler region where it may be further relayed by conventional optical fiber to a remotely located detector. Blackbody measuring devices have found applications, among other things, in monitoring temperatures inside environments such as an internal combustion engine, a gas turbine, or a rocket exhaust stream. These environments are characterized by high temperature (500°–2000° C.), rapid temperature fluctuations (e.g. 5000 Hz) and high flow rates (as much as Mach 2). To adequately monitor the rapid temperature fluctuations, the blackbody emitter must have a fast response time with a frequency response in the thousands of Hertz range. In order to achieve this order of frequency response, prior art has focused on minimizing the effective thermal capacity of the blackbody emitter. Those blackbody cavities are typically formed by evaporating or sputtering a metallic film of a few micrometers in thickness onto the tip of a lightpipe. Maximum frequency response has been achieved by the low thermal mass and high thermal conductivity of the thin metallic film.

For example, U.S. Pat. No. 3,626,758 to Stewart et al., discloses a remote radiation temperature sensor for a gas turbine. A blackbody radiator is formed on the conical tip of a tubular body. The blackbody radiator is preferably thin and formed of a metallic material of high thermal conductivity. The metallic material may be formed by vacuum deposition of the predominantly nickel and molybdenum alloy known as Hastelloy.

U.S. Pat. No. 4,576,486 to Dils, discloses an optical fiber thermometer employing a blackbody cavity at a tip of a high temperature optical fiber. The blackbody cavity is formed by sputtering a thin optically dense metallic or oxide coating on the surface of the optical fiber.

Similarly, Chinese Patent, Application No. 89200371.5, Publication No. 2046210U to Zhou, et al. discloses a blackbody temperature sensor formed by sputtering a layer of high temperature, non-oxidizing material onto a lightguide.

U.S. Pat. No. 4,679,934 to Ganguly et al., discloses Fiber Optic Pyrometry with a Large Dynamic Range. A blackbody radiating member is preferably fabricated as an iridium metal film on an optical fiber, while a protective film layer is preferably fabricated as an aluminum oxide film.

While a blackbody cavity formed by a sputtered thin metallic film has fast response, it is nevertheless not very durable. The metallic film will generally not last very long in abrasive environments with high flow rates such as inside an internal combustion engine or a gas turbine. In fact, a blackbody temperature sensor with a platinum film may only last over the duration of one temperature measurement in a gas turbine experiment. It should be noted that even an accidental scratch on the film can alter its effectiveness as a blackbody and hence its accuracy as a sensor.

Attempts have been made to improved the durability of the thin metallic film by adding a protective overcoat to it. For example, U.S. Pat. No. 4,576,486 to Dils also discloses an overcoating protective film. The protective film, 1 to 20 micrometers thick, is formed by sputtering aluminum oxide over the metal film which is located on a sapphire or zirconia fiber.

Another disclosure is found in Hypszer et al., "Optical Fibre Temperature Sensor Based on a BlackBody Radiation", SPIE Vol 1085, Optical Fibres and Their Applications V, pp. 476-479, (1989). This article discloses forming a blackbody on a quartz rod. The blackbody consists of a metallic layer surround a tip of the quartz rod. The metallic layer is formed by evaporation of chromium. A protective layer of silicon monoxide covers the metallic layer.

In practice, for high temperature blackbody sensors, protective layers have typically been applied as a sputtered, thin polycrystalline oxide film not exceeding a few micrometers thick. Protective layers more than a few micrometers have not been used for several reasons. First, considerable time and cost are required to sputter a thick layer of oxide material. Secondly, a thicker layer would appear to decrease the effective thermal responsivity of the thin film blackbody, thereby compromising the response time. Thirdly, and more seriously, a thick protective overcoat layer takes on its own bulk material characteristics and may not reliably adhere to the lightpipe or substrate. Having the metallic thin film sandwiched between the oxide materials makes the situation worse. This is because the device is subjected to a very wide temperature range from room temperature to thousands of degrees Celsius. Over this range, the materials forming the substrate and the protective overcoat would not only change their relative dimensions dramatically but may also have undergone phase changes. The differential volume changes and surface properties over the temperature range would readily crack or dislodge a thicker and poorly adhering protective overcoat.

A thick ceramic coating (typically 1 to several millimeters thick) forming a blackbody temperature sensor has been disclosed by Dr. Zhihai Wang in "Blackbody Optical Fiber Thermometers and their Applications, " Ph.D Thesis, Qing-Hua University, Beijing, Peoples Republic of China, 1989. The coating is formed by baking a layer of metal oxides mixture onto a sapphire substrate. The metal oxides mixture is essentially zirconia stabilized by CaO, MgO and $Y_2O_3$. The technique is to bake the layer for an extended period (e.g. 12 hours) at a temperature (e.g. 1000° C.) well below the melting point of the ingredients in the mixture. This results in the formation of a highly porous ceramic layer. The incorporation of many air spaces into the layer is essential for absorbing some of the differential volume change described earlier and prevents the thick coating from cracking or dislodging from the substrate. However, this device has poor frequency response and is time-consuming to make. The ceramic layer is relatively thick in order to build up sufficient opacity to form a blackbody cavity. The large bulk and the poor thermal conductivity of trapped air result in a slower responding device.

On the other hand, a thin protective layer of a few micrometers formed by conventional sputtering techniques offers little protection to abrasion in a high fluid flow rate environment. Nevertheless, despite the high cost of sputtering an oxide or ceramic material, a protective layer is applied to some application-specific temperature sensors to isolate the underlying platinum film from possible catalytic interactions with the high temperature environment, and generally to provide additional mechanical protection of the platinum film.

Other solutions have been attempted by practitioners in the field, such as in the following disclosures.

U.S. Pat. No. 4,794,619 to Tregay, discloses an Optical Fiber Temperature Sensor where the blackbody sensor is formed by a cavity inside the optical fiber.

U.S. Pat. No. 4,906,106 to Kaufman et al., discloses a pyrometric temperature measuring instrument in which a blackbody sensor is formed by first removing the cladding at a tip of a cladded glass fiber and applying to the nude tip a black paste consisting of a mixture of finely dispersed carbon and silicon. This technique is only applicable for low temperature measurements, as the matrix will decompose in air at a few hundred degrees C.

European Patent Application No. 90311575.6, Publication No. 0 425 229 A1 to Lee et al., (Priority U.S. patent application Ser. No. 07/427,179, filed Oct. 23, 1990) discloses a hollow light guide being used to transmit radiation from an emissive member to a detector. The hollow light guide is made of high temperature metals, ceramics, metal alloys, materials with dielectric coating, or ceramic materials with metallic film coating. The emissive member may be one of three forms: a dot; a film or coating; or a blackbody cavity. For a film or coating, it may be applied by sputtering, evaporation, dipping, coating, etc. to close an opening at a tip of the hollow light guide. For a blackbody cavity, it is a separate structure mechanically mounted at a tip of the hollow light guide. The blackbody cavity may be made of high temperature metal, but can be also made of a transparent ceramic sphere or cavity with its surface sputtered with an optically dense film of metallic or oxide coating. It is apparent that this system would not have good high frequency response.

Holmes, "Fiber Optic Probe for Thermal Profiling of Liquids During Crystal Growth", Rev. Sci. Instrum., 50(5). pp. 662-663 (May, 1979), discloses a temperature probe formed by a small bead of graphite cement on a quartz optical fiber. The article states that the response time is 10 times faster than a conventional sheathed thermocouple due to the absence of a convention protective sheath.

However, these attempts provide only partial solutions to the above-mentioned problems while creating new problems and compromises of their own.

There is still a need for a rugged and low cost temperature measuring device which is suitable for applications in high temperature environments including that characterized by rapid temperature fluctuations and high flow rates.

SUMMARY OF THE INVENTION

Accordingly, it is a general object of the present invention to provide an improved temperature measuring device capable of operating in a high temperature, high flow rate and abrasive environment.

It is another object of the present invention to provide a blackbody temperature measuring device capable of measuring high temperature with a fast response time.

It is another object of the present invention to provide a blackbody temperature measuring device which is durable under repeated cycling from low to high temperatures.

It is another object of the present invention to provide a method for reliably and economically manufacturing a durable, high temperature and high speed temperature sensor.

These and additional objects are accomplished by forming a thermally fused coating of composite ceramic material on the tip of a high temperature lightpipe or fiber to form a blackbody temperature probe. The ingredients of the composite ceramic material include refractory metal oxides, forming the bulk of the material, combined with various pigments and/or powdered refractory metals, plus binding agents.

According to another aspect of the invention, the coating of composite ceramic material is thermally fused on the tip of the lightpipe or fiber by a process which includes preparing a slurry containing the basic ingredients of the composite ceramic material, applying a layer of said slurry to a tip of the optical lightpipe or fiber, and firing said layer at elevated temperatures to form a thermally fused coating of composite ceramic material. The process may also include preheating the lightpipe or fiber substrate, successive coating and drying to form a resultant layer of desired thickness, and annealing the resultant coating at predetermined elevated temperatures.

One embodiment for implementing the thermally fused process is to use a flame technique. Another embodiment is to use a furnace technique. Yet other embodiments are to use flame-spraying or plasma-spraying techniques.

According to another aspect of the invention, a temperature sensor with a blackbody optical cavity formed by a thermally fused coating of composite ceramic material between 10 to 500 micrometers thick may be advantageously used for a wide range of applications including measurements in high temperature, high flow rate and abrasive environments such as those environments in an internal combustion engine, a gas turbine or a rocket exhaust stream.

One important aspect of the present invention is the replacement of the conventional sputtered metallic film by a thermally fused composite ceramic material in the forming of a blackbody emitter. By adjusting the ingredients of the composite material, a blackbody optical cavity of a desired opacity and emissivity can be obtained. Unlike conventional devices, the composite ceramic coating is formed by a high temperature thermal fusion process which bonds the coating layer intimately with the lightpipe or fiber substrate. The formation of a blackbody emitter using thermally fused composite ceramic material has several advantages. It is much more durable than that formed by conventional sputtering process. The thermal fusion process does not require expensive sputtering equipments. The resultant blackbody emitter formed has improved immunity to contamination and extraneous interactions with the environment being measured. Conventional devices would require two expensive sputtering processes to put on the metallic film followed by an oxide film, and the result is still less than satisfactory.

Additional objects, features and advantages of the present invention will be understood from the following description of the preferred embodiments, which description should be taken in conjunction with the accompanying drawings.

DETAILED DESCRIPTION OF PREFERRED EMBODIMENTS

Figure 1:
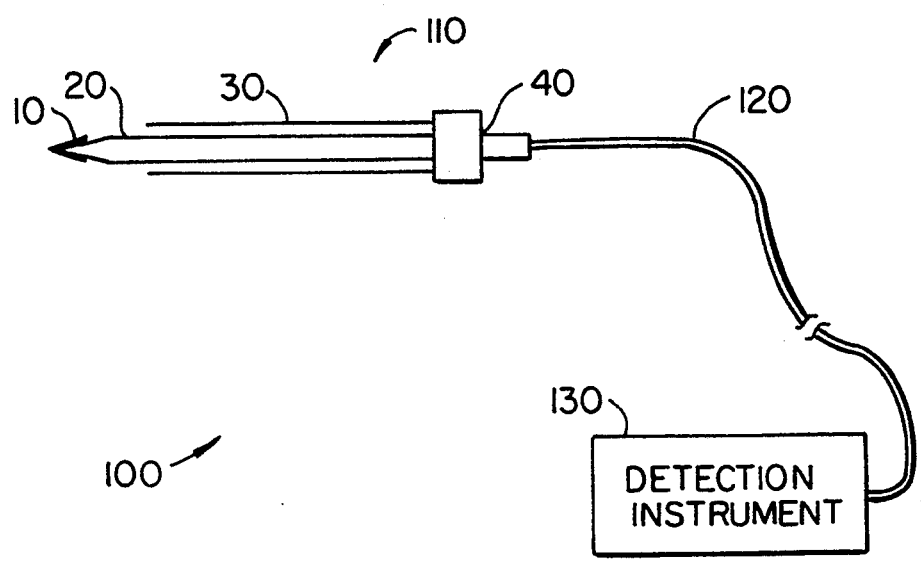
FIG. 1 illustrates schematically a typical temperature measuring system with which the temperature probe of the present invention is used.

FIG. 1 illustrates schematically a typical temperature measuring system with which the temperature probe of the present invention is used. The temperature measuring system 100 includes a high temperature probe 110 which is optically connected to a detection instrument 130 via a second optical fiber 120 which may be made of the same material as the probe or of a lower temperature optical fiber. The probe 110 includes a blackbody emitter 10 in the form of an optical cavity formed by a thermally fused coating of composite ceramic material on the tip of a lightpipe 20. Optionally, a protective sheath 30 for added mechanical durability may encase all or most length of the lightpipe 20. In operation, the probe 110 is placed in a high temperature environment the temperature of which is to be measured. Both the lightpipe 20 and the optional sheath 30 are made of high temperature materials. The lightpipe 20 serves to guide the radiation from the blackbody emitter 10 to a region removed from the high temperature environment. The second optical fiber 120 is optically connected to the lightpipe 20 by means of a connector 40 to relay the radiation from the lightpipe 20 to the instrument 130 which contains a radiation detector. The lightpipe 20 and the connecting fiber 120 must be able to transmit radiation from the blackbody emitter 10 in the operating spectral range of the detection instrument 130. Examples of suitable materials for the lightpipe, depending on the application temperature, are quartz with an operational temperature up to 900° C. or single-crystal aluminum oxide (Sapphire) with a melting point of about 2000° C. or single-crystal Zirconium oxide with a melting point of about 2500° C.

According to one embodiment, the lightpipe 20 is in the form of a rod which typically has a diameter of 1.25 mm and is up to 50 cm long. The relaying optical fiber 120 is typically a fused silica fiber which could run to 100 meters in length and has an ambient temperature tolerance of 200° C.

According to another embodiment the lightpipe 20 is in the form of an optical fiber with a diameter of about 200 micrometers or less fabricated from the high temperature material described above. In this case, the high temperature optical fiber may run directly to the detection instrument without the need for the relaying lower temperature optical fiber 120 and coupler 40.

After the radiation is guided to the detection instrument 130, it is sensed by the detector operating in either the infra-red or the visible portion of the spectrum. The resultant signal is processed to display the temperature. An example of such an instrument is the Optical Fiber Temperature System, Model 100 manufactured by Luxtron/Accufiber Division, Beaverton, Oreg.

Figure 2A:
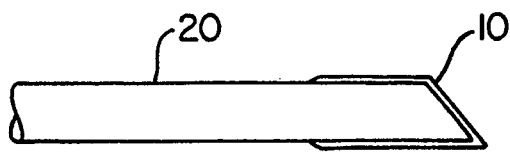
FIGS. 2(a)–2(g) illustrate example implementations of the temperature probe of the present invention.
Figure 2B:
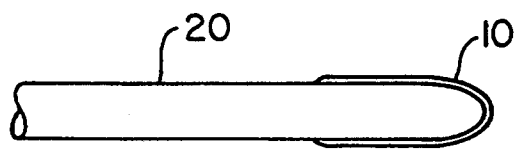
Figure 2C:
Figure 2D:
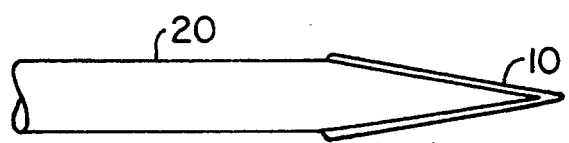
Figure 2E:
Figure 2F:
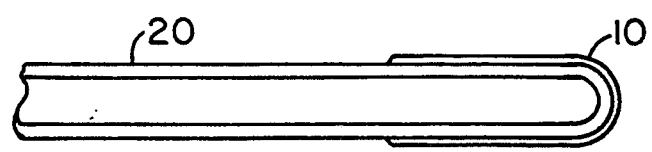
Figure 2G:
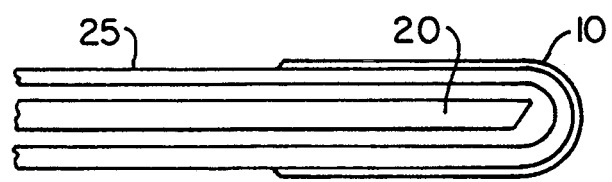

FIGS. 2(a)–2(g) illustrate schematically example implementations of the temperature probe. FIG. 2(a) shows a lightpipe 20 with a bevelled tip on which the blackbody emitter 10 in the form of a thermally fused composite ceramic coating is formed. FIG. 2(b) shows a blackbody emitter 10 formed on a rounded tip of the lightpipe 20. FIG. 2(c) shows a blackbody emitter 10 formed on a recessed tip of the lightpipe 20. FIG. 2(d) shows a blackbody emitter 10 formed on a conical tip of the lightpipe 20. FIG. 2(e) shows a blackbody emitter 10 formed on only the smaller diameter portion of a conical tip of the lightpipe 20. FIG. 2(f) shows a hollow tubular lightpipe 20 and a blackbody emitter 10 is formed on a rounded tip of the lightpipe. Suitable materials for the optical extension are sapphire fiber, fused silica fiber, or possibly glass fiber, depending on the wavelengths to be detected. FIG. 2(g) shows a lightpipe 20 surrounded by a hollow tubular casing 25. A blackbody emitter 10 is formed on a rounded tip of the hollow tubular casing 25. Radiation from the blackbody emitter 10 is captured by the encased lightpipe 20 through the transparent walls of the hollow tubular casing 25.

The blackbody emitter 10 typically has a length-to-diameter ratio of from 2:1 to 5:1. The smaller ratio is more suited for applications requiring faster response time and finer spatial resolution. The larger ratio one is easier to fabricate and is intended for general purpose use.

As described earlier, an important feature of the present invention is the replacement of the conventional sputtered metallic film and oxide protective film by a thermally fused composite ceramic material in the forming of a blackbody emitter.

According to one preferred embodiment, the coating of the thermally fused composite ceramic onto the tip of the lightpipe or substrate 20 is accomplished by a flame technique. As a specific example, the blackbody cavity is formed on a sapphire substrate, although when appropriate, reference is made to other type of substrate material with corresponding scaling of process temperatures appropriate for the melting points of the materials.

The coating is fabricated onto the lightpipe or fiber substrate by a series of steps including shaping the substrate, cleaning and preparation, forming and drying the coating, firing, and annealing.

The initial shaping step is usually accomplished by grinding and polishing the tip of a rod or fiber of sapphire into a shape as shown in FIGS. 2(a)-2(f). The polished tip will enable a blackbody cavity of the desired properties to be formed on it.

The cleaning step is accomplished by first acid washing the substrate. The sapphire substrate is preferably given a 24 hour soak in 50% hydrofluoric acid (HF) at room temperature. In the case of a quartz substrate, a 10 minute soak with 5% HF is sufficient. Methanol or other suitable solvents are used to remove any organic contamination from the lightpipe substrate. Next, the sapphire substrate is heated in a clean gas flame (oxidizing) to greater then 1300° C. until the flame is colorless to assure any remaining contamination is burned off.

The coating material comprises a mixture of refractory metal oxides, pigments and/or powdered refractory metals, and binding agents. The refractory metal oxides form the bulk of the material.

The pigments and/or powdered refractory metals are used to adjust the opacity and emissivity. Pigment material can be composed of many different compounds such as $CuCr_2O_4$, $MnO$, $MoO_3$, $(Ni,Fe)(Cr,Fe)_2O_4$, $(Co,Fe)(Fe,Cr)_2O_4$, $FE_2O_4$, $CuO$, $(Fe,Mn)(Fe,Mn)_2O_4$ and other metal oxides. In applications where high frequency response is required, a metal such as iridium powder is preferably used because it has much smaller thermal capacity and a better conduction coefficient.

In one embodiment the refractory metal oxide makes up 70% by weight of the mixture, with 40% Zirconia (stabilized with 6% Calcium Oxide), and 30% Chromic Oxide. The pigment, in the form of Manganese Copper Ferrite (Black Spinal crystal), makes up the next 20% by weight. The final 10% by weight is Silica which is used as a flux and a binding agent. These compounds are ground together in a mortar and pestle until a fine uniform powder is obtained ($< -200$ mesh). This mixture is then mixed into a thick slurry with 85% Phosphoric acid which acts as a carrier and also helps as a binder during the firing process. The slurry viscosity is adjusted to optimize the workability of the coating during the forming stage by adjusting the proportion of Phosphoric acid. It has been found that phosphoric acid is particularly suitable although other acids or alkalis are also usable.

Prior to the application of the coatings the substrate must be preheated to drive off any residual moisture and contamination which has been adsorbed on the surface. The preheated substrate also serves to supply heat to activate the Phosphoric acid. It has been observed that this step is necessary to change the surface tension of the slurry, allowing it to wet the surface of the substrate. The substrate is heated to several hundred degrees Celsius and then allowed to cool in a uniform manner in air to approximately one hundred degrees Celsius. If the substrate is too hot during the coating procedure, it may be thermally shocked or cause the slurry to spatter by exceeding its boiling point. The slurry is best applied onto the heated substrate while it is being rotated to assure a uniform coverage. The lightpipe may be dipped, sprayed, or hand painted with a brush, to obtain a thin uniform coating. The coating thickness at this stage prior to densification is estimated to be between ten to several hundred micrometers thick, but this will depend on the number of coatings, the viscosity of the slurry, the temperature during drying, and specific physical characteristics of the powders (i.e. particle size, etc.). This coating of slurry is slowly thickened and solidified by gently heating the lightpipe in a flame and allowing the heat to be conducted to the film. This method heats the coating from the inside out and activates the Phosphoric acid. The heating is done slowly enough to assure the slurry does not boil and produce bubbles in the coating. As the drying (curing) process continues, the heating flame is moved closer to the film and after approximately five minutes the film is slowly moved through the flame to obtain a uniformly dried solid coating. The outer portion of the flame is used as a gentle heat source, and it is estimates to be around 400° C. Thicker coatings are developed by repeating this coating and drying procedure until the desired thickness is obtained. The drying stage has also been successfully accomplished by using radiant heat sources that thermally couple directly to the coating surface.

A firing step requiring high temperatures is used to thermally fuse the coatings into a hard surface with good attachment to the substrate. This step can be accomplished with a heat source capable of melting the substrate.

In one embodiment, a flame technique is employed. In the case of Sapphire (melting point 2040° C.) a Hydrogen-Oxygen or Propane-Oxygen gas torch will suffice. As in previous steps the substrate is continuously rotated to assure uniform processing. If a flame is used, the coated substrate is slowly moved from the outer, more cooler regions into the concentrated hot cone of the flame over a period of approximately five minutes to gradually bring the sensor up to fusing temperature. Once the hot portion of the flame is reached, the coating is monitored for the occurrence of a semiliquid densification. When that occurs, the sensor must be removed to a cooler portion of the flame within fifteen seconds or so to avoid catastrophic melting of the substrate. It is important that the flame heats the coating uniformly at all times during the firing procedures and that the edge of the hot zone is well defined and is not directed onto the uncoated substrate. During the fusing phase, the coatings can be observed to shrink, and become smooth in texture. After the fusing is complete, the sensor must be progressively moved to cooler portions of the flame over a period of time not less than five minutes to allow for annealing. This is generally done in five stages of one minute each, however, for sensors larger than 1.25 mm in diameter slower cool down rates are required. With a Sapphire substrate a good quality coating will appear ruby red near the edges resulting from the incorporation of chromium into the sapphire. If this is not observed, the firing temperature was too low and good coating adherence may be jeopardized.

Multiple coatings can be formed over each other to develop the thickness, shape, or opaqueness required by the application.

In another embodiment, a radiant heat source is employed. A suitable one is a zirconia tube furnace. The furnace is preheated to a temperature above that of the melting point of the substrate. In the case of a sapphire substrate a temperature of 2200° C. is preferable. The rotating coated substrate is inserted into the tube furnace and heated by radiation coupling directly to the coating. The coating will heat faster than the substrate because of its higher absorption. This allows the achievement of high fusing temperatures of the coating without melting more than the interface surface of the substrate. The fusing temperature is much easier to control with this method. Annealing is accomplished in the same manner as with the flame technique.

In yet other embodiments, the thermally fused coating is applied by thermal-spraying techniques, such a flame-spraying or plasma-spraying.

In a flame-spraying process, a powder mixture or a solid containing ingredients of the composite ceramic material is fed into a high temperature, high velocity gas torch. The resultant high temperature micro-droplets depositing on the tip of the lightpipe or fiber substrate forms a thermally fused coating. Commercially available flame-spraying systems and techniques are well known. An example is Rodike ceramic spray system manufactured by Norton Company, Worcester, Mass. The system brochure is incorporated herein by reference.

In a plasma-spraying process, a powder mixture or a solid containing ingredients of the composite ceramic material is fed into a plasma torch. The resultant high temperature micro-droplets depositing on the tip of the lightpipe or fiber substrate forms a thermally fused coating. Commercially available plasma-spraying systems and techniques are well known.

For applications requiring particularly high frequency response sensors, a low thermal capacity, high thermal conductivity material is used instead of a pigment as the light-blocking material. Examples are finely granulated metals such as Platinum or Iridium. This also increases the surface roughness and helps to increase the heat transfer to the coating by disturbing the boundary layer in a flow environment.

Surprisingly, the high frequency response of a temperature sensor made by the process of the present invention turns out to be comparable to that made with a conventional high speed metallic film over a wide frequency domain. This result goes against conventional thinking that a thicker ceramic coating would respond much more slowly to a temperature change than a highly conductive metallic thin film.

The thermally-fused composite ceramic coatings of the invention have been found in practice and in tests to produce blackbody temperature sensors with responses that compare favorably to their platinum counterparts. This is in spite of the difference that the sputtered platinum thin film is only a few micrometer thick while the coating formed by the thermally fused composite ceramic is about 100 micrometers thick. Tests have shown that over a frequency range of several thousand Hz, the responsivity of the ceramic sensor is comparable with, or within one order of magnitude of, that of the platinum sensor. The method and device of the invention are suitable for monitoring temperatures having variations with a characteristic frequency between zero and 8,000 Hz.

The thermally fused blackbody cavity of the present invention is characterized by a solid film composite ceramic material which is formed relatively rapidly at temperatures close to melting points of the ingredients of the composite material and that of the substrate. The firing process appears to involve several reactions including sintering, fusing of composite materials and epitaxial recrystalization with a surface-melting substrate. The resultant fused film bonds tightly to the substrate to form a hard and robust layer. It also has relatively good thermal conductivity. The thickness of the coating preferably ranges from tens to hundreds of micrometers. The inclusion-of pigments and/or metals makes the thin film optically opaque at the system response wavelength. The blackbody cavity has fast response, is resistant to acid attack and contamination and can operate in air at temperatures close to the melting point of the substrate. Its thermal coefficient of expansion is commensurate with the substrate's over a wide operating temperature range resulting in minimum thermal shock. This is due to the fusing of composite ingredients such as chromic oxide and silica into the bulk material such as zirconia. The chromic oxide with a melting of 1990° C. works as a volume balancing material in between the zirconia particles when zirconia changes its crystal phases with temperature. It has the same crystalline structure as sapphire and can therefore form a direct epitaxial bond on a sapphire substrate. The fused silica with a melting point of about 1713° C. forms an amorphous glassy phase, acting like a glue in the structure. It combines with sapphire fiber, zironcia and other material and therefore, in complement with chromic oxide, forms a composite ceramic material which is "mechanically adaptable" over a wide temperature range.

In applications where the monitored temperature is below 900° C. the composite ceramic blackbody may advantageously and economically be formed on a quartz substrate. Generally, similar techniques and materials apply, with the added advantage that conditions for quartz are less demanding than for sapphire, because of lower coefficient of expansion and lower operating temperatures. In this case, the ingredients for the composite material are adjusted appropriately, corresponding to the scale-down in temperature. Since $SiO_2$ is the main "plastic phase" ingredient in the ceramic composite material at the scaled-down temperature, the $SiO_2$ component is preferably increased from 10% to 20% or 30%. However, since $SiO_2$ is transparent, an increased proportion thereof will dilute the opacity of the resultant coating. Therefore, the proportion of pigment or metal powder needs to be increased to compensate for the dilution without resorting to a thicker film.

In one embodiment where ruggedness is desired, the $Cr_2O_3$ component can be increased at the expense of the pigment, since with a higher proportion of $Cr_2O_3$ the coating and is less brittle than that with a higher proportion of pigment. The $SiO_2$ component is preferably at 20%, the $Cr_2O_3$ component is increased from 30% to 40%, and the $ZrO_2$ component will then be decreased from 40% to 20% with the pigment remaining at 20%.

In another embodiment where $Cr_2O_3$ may act as a contaminant, such as in applications involving semiconductor device fabrications, it may be omitted as an ingredient. The opacity can then be achieved with noble metal powders. The $SiO_2$ component is preferably at 30%, and $ZrO_2$ at 40%, the remaining 30% being pigment material such as Iridium powder or other opaque materials.

The material may be applied on the quartz substrate by the same general techniques as described for the sapphire substrate. The temperature of the furnace is adjusted to 1300° C. for the tube furnace method. A Propane/air torch is preferably used in the flame method.

While the embodiments of the various aspects of the present invention that have been described are the preferred implementation, those skilled in the art will understand that variations thereof may also be possible. The device and method described therein are applicable to a full range of temperature measurements consistent with the properties of the disclosed materials and devices. Therefore, the invention is entitled to protection within the full scope of the appended claims.

It is claimed:

1. A temperature probe for monitoring the temperature of a high temperature environment, comprising:
   an optical lightpipe or fiber formed from a material having a high melting point and being transparent to radiation detectable by an external detecting device; and
   an optical cavity forming a blackbody or greybody emissive element for sensing the temperature of said environment, said blackbody or greybody emissive element being characterized by emitting radiation as a given function of the temperature, and being formed by a thermally fused coating of composite ceramic material surrounding a tip of said optical lightpipe or fiber.

2. A method of monitoring the temperature of a high temperature environment, comprising the steps of:
   positioning an optical cavity forming a blackbody or greybody emissive element in thermal communication with said environment, said blackbody or greybody emissive element being characterized by emitting radiation as a given function of the temperature and being formed by a thermally fused coating of composite ceramic material surrounding a tip of an optical lightpipe or fiber, and said lightpipe or fiber being formed from a material having a high melting point and being transparent to radiation detectable by an external detecting device; and
   guiding the radiation from the blackbody or greybody emissive element via said lightpipe or fiber to the external detecting device, thereby to effect monitoring of temperatures having variations with a characteristic frequency between zero and 8000 Hz.

3. A method of monitoring the temperature of a high temperature environment as in claim 2, wherein said thermally fused coating of composite ceramic material preferably has a thickness between 10 to 500 micrometers.

4. A method of monitoring temperatures in high temperature, abrasive and high flow rate environments, comprising the steps of:
   positioning an optical cavity forming a blackbody or greybody emissive element in thermal communication with said environment, said blackbody or greybody emissive element being characterized by emitting radiation as a given function of the temperature and being formed by a thermally fused coating of composite ceramic material surrounding a tip of an optical lightpipe or fiber, and said lightpipe or fiber being formed from a material having a high melting point and being transparent to radiation detectable by an external detecting device; and
   guiding the radiation from the blackbody or greybody emissive element via said lightpipe or fiber to the external detecting device, thereby to effect monitoring of temperatures having variations with a characteristic frequency between zero and 8000 Hz.

5. A method of monitoring temperatures in high temperature, abrasive and high flow rate environments as in claim 4, wherein said thermally fused coating of composite ceramic material preferably has a thickness between 10 to 500 micrometers.

* * * * *